July 27, 1937.  L. H. DRAEGER  2,088,153
TOW COUPLING
Filed March 16, 1937
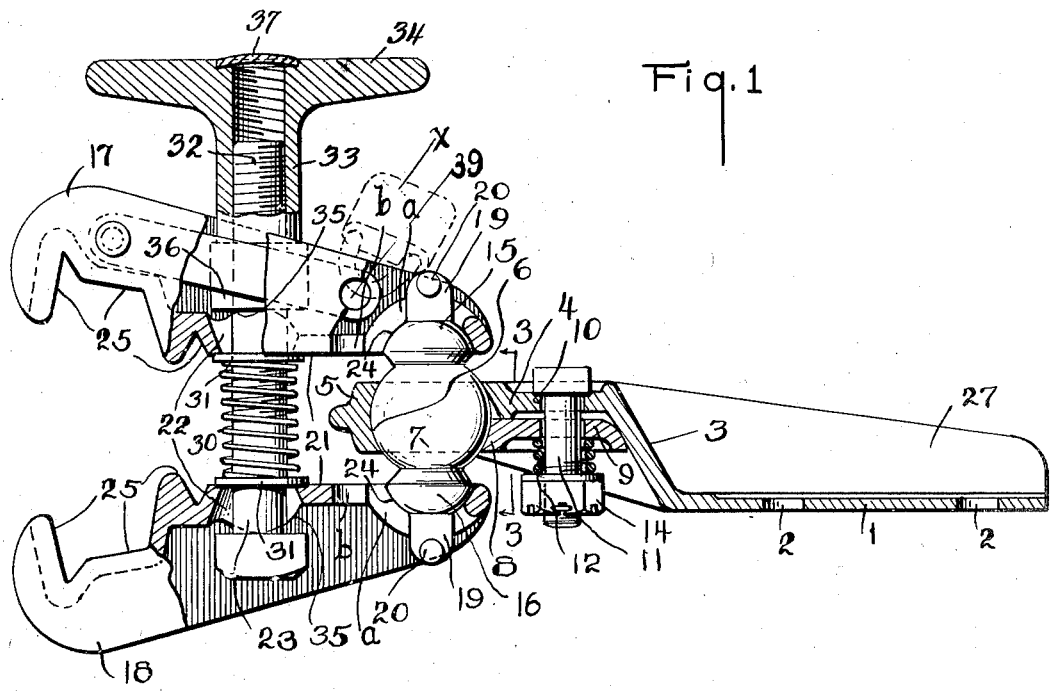
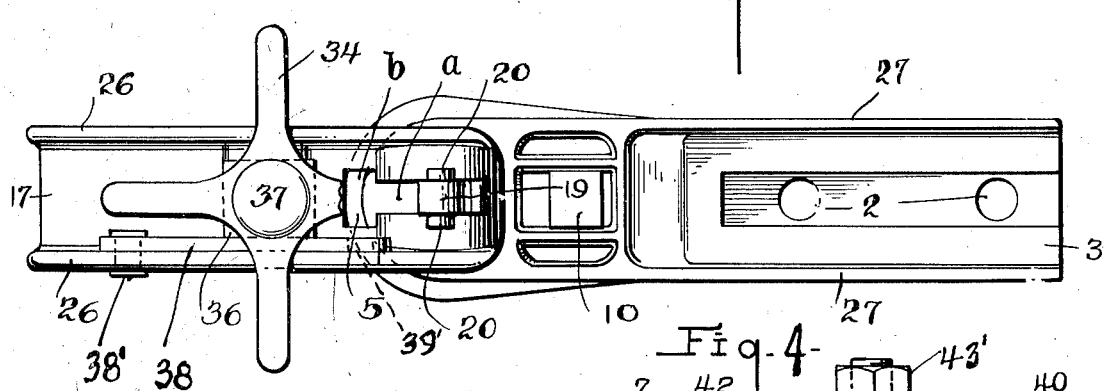
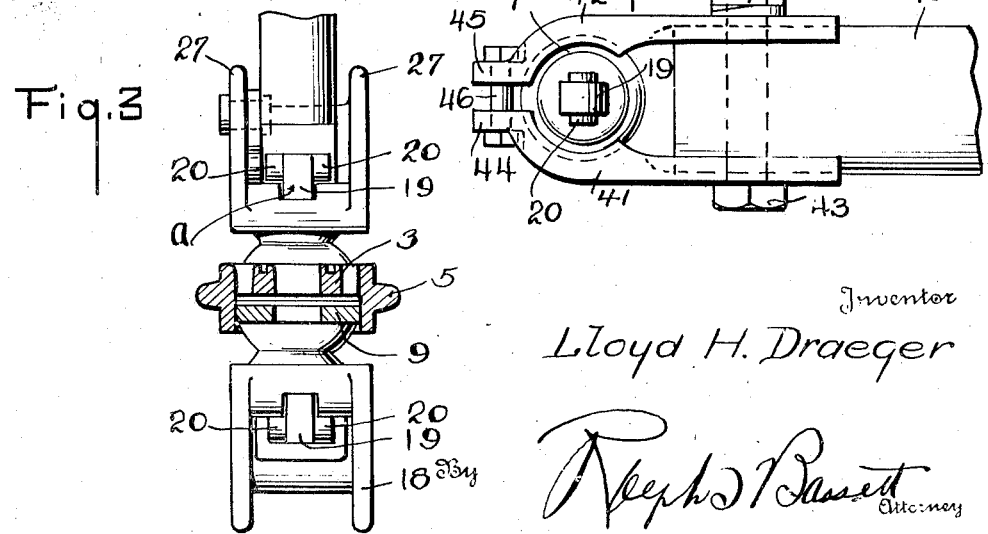
Inventor
Lloyd H. Draeger
By Ralph V. Bassett
Attorney Patented July 27, 1937

2,088,153

UNITED STATES PATENT OFFICE 2,088,153

TOW COUPLING

Lloyd H. Draeger, Milwaukee, Wis.

Application March 16, 1937, Serial No. 131,263

17 Claims. (Cl. 280—33.15)

This invention relates to new and useful improvements in tow couplings and embodies an assembly including a two-part clamp and a connector, the clamp and connector being coupled by means of a universal connection.

The main object of the present invention is to provide a clamp so constructed that the jaws while positively adjustable, nevertheless are so mounted to permit slight movement whereby suitable accommodation is provided in the gripping or seating of the jaw elements.

A further object of this invention is to combine with a tow clamp, a connecting element and unite these parts so that universal movement may be had, thus permitting essential movement of the parts during the towing operation and thereby eliminating stresses and strains which might otherwise be present and injure parts of the assembly.

More specifically this invention comprehends the use of a pair of jaws, normally separated by spring means, but capable of tight clamping adjustment; the individual jaws being connected to a coupler element in a manner to permit universal movement of the latter while at the same time provision is made for individual adjustment of the parts to facilitate positive gripping action.

Other objects and features will more clearly hereinafter appear by reference to the accompanying drawing and specification wherein like characters of reference designate corresponding parts throughout the several views, in which—

Figure 1 is a side elevational view, parts being broken away in section,

Figure 2 is a top plan view,

Figure 3 is a section on line 3—3 of Figure 1, and

Figure 4 is a top plan view showing the connection between the intermediate member and a standard pipe tow bar.

In the present disclosure there is shown a plate 1 provided with bolt openings 2 for attachment to a power vehicle in any desired manner. The plate 1 projects upwardly at 3 and horizontally at 4 to provide an offset extension 5. The offset extension 5 is formed with a spherical socket 6 for enclosing the ball member 7. To facilitate the arrangement of the ball in the socket, a portion of the socket wall 8 is removable. This socket section 8 includes a plate extension 9 formed with a central opening which registers with an opening 10 in the offset portion 4 for the accommodation of a bolt 11 which extends therethrough. A spring 12 and lock nut 14 are used on the bolt to provide a resilient clamping action between these parts. By this arrangement the connecting plate 1 has a substantial universal movement on the ball 7 and these parts are removable in the manner shown and described.

Extending axially of the ball 7 and formed as an integral part thereof are the projections 15 and 16, each of which is formed with a semi-spherical outer face for engagement with suitably formed portions of the inner ends of the clamping jaws 17 and 18. Axially aligned projections 19 extend from the spherical bearing portions of the projections 15 and 16 and at points suitably spaced from these bearing surfaces are provided transverse lugs 20.

The jaws 17 and 18 are of substantially companion construction, in that each include a central body portion 21 formed with registering outwardly tapered openings 22 for the passage of the adjusting bolt 23. As heretofore stated the inner faces of the inner ends of the jaws are each formed with substantially semi-spherical sockets 24 which engage the bearing portions 15 and 16 projecting from the ball 7. The walls forming the sockets 24 are slotted longitudinally at $a$ to merge with transverse slots $b$ formed in the central body portions 21 of the jaws 17 and 18 to facilitate the passage of the pins 20 during assembly. It will be noted that the pins 20 are spaced from the bearing surfaces 15 and 16 a distance just sufficient to accommodate the wall forming the socket 24 and during movement of the jaws these pins retain the parts in their respective positions without interfering with relative movement thereof. The outer ends of the jaw members 17 and 18 are formed with a series of irregular cooperating faces 25 which are so formed and arranged as to cooperate with bumpers and other automobile parts with which engagement is to be had.

It will be noted that the jaw members are each provided with reinforcing flanges 26, which latter also provide pockets for parts to be hereinafter described. The connecting plate 1 is likewise provided with flanges 27 which strengthen these parts and protect and tend to conceal such connecting elements as may be utilized with the openings 2 for securing this part in place.

For retaining, adjusting and securing the jaws 17 and 18 there is provided the bolt 23 heretofore mentioned. The bolt 23 is inserted upwardly through the jaws by virtue of the openings 22 and these openings as heretofore stated are formed with outwardly inclined faces whereby freedom of movement of the jaws is permitted. Between the jaw members there is provided the expansion spring 30 arranged between the washers 31 which seat against the inner faces of the jaws 17 and 18. The upper end of the bolt 23 is threaded for a portion of its length at 32 and an elongated nut 33 having handle portion 34 which engages these threads for adjustment of the jaws 17 and 18. It will be noted that the jaws 17 and 18 are formed with rounded bearing portions 35 to permit a self centering movement of the bolt head and the lower enlarged extremity 36 of the nut 33. A cover plate 37 is shown for enclosing the threaded opening in the nut.

The lower extremity 36 of the nut 33 is formed square, hexagonal or with a flattened face and a link 38 pivoted to the inner face of reinforcing flange 26 by pivot pin 38' is adapted to be moved between this flattened face of extremity 36 and the flange 26 to prevent rotation of the handle 33. The extremity of the link 38 is perforated at 39 and this perforation registers with perforation 39' in the adjacent flange 26. A suitable lock X may be used to secure these parts in fixed relation.

In Figure 4 the disclosure comprehends a modified form in which a pipe spacer is used in connection with the coupling. The pipe spacer or tow pole 40 is swiveled to the ball 7 by means of the jaws 41 and 42, provided with curved inner faces complemental to the outer surface of the pole on pipe section 40 and secured thereto by means of the transverse bolt 43. The bolt 43 passes through the adjacent jaw sections and the pipe 40 and is retained in place by the usual nut 43'. The outer ends of the jaws 41 and 42 are bent around the ball 7 and are formed with inner bearing faces to accommodate the latter and permit a swiveled action. The extremities 44 and 45 of the jaws 41 and 42 are extended axially of the assembly and are perforated for reception of the bolt 46 which secures them in adjusted position.

I claim:

1. In a device of the character described, a ball member formed with axially spaced bearing extensions, a connector plate adjustably engaging said ball, expansible jaw members formed with sockets for engaging the spaced bearing extensions, means carried by said extensions for removably securing said jaw members on said bearing extensions, and means for opening and closing said jaw members.

2. The substance of claim 1 characterized in that a spring is provided for normally expanding the jaw members.

3. The substance of claim 1 characterized in that the connector and the jaw members are each independently mounted for relative movement.

4. The substance of claim 1 characterized in that the connecting plate and jaw members are each removable and independently adjustable.

5. In a device of the character described, a ball member formed with spaced bearing extensions, a connector plate swiveled about said ball member, jaw members formed with sockets for engaging the spaced bearing extensions, means carried by said extension for retaining said jaw members in engagement with said bearing extensions, adjustable means for closing said jaw members, and locking means for said adjusting member.

6. A tow coupling including a ball having spaced bearing extensions, a sectional connector element in swiveled engagement with the ball member, spaced jaws formed with bearing surfaces for engaging the bearing extensions of said ball, means for adjusting said jaw members and means for retaining the bearing portions of said jaw members in normal engagement with the spaced bearing extensions.

7. In a tow coupling, a connector element including a pair of adjustable jaws formed with curved socket portions, a ball member positioned in the socket portions of said jaws and having extensions projecting beyond said jaws, said extensions being provided with curved bearing faces, projections extending from said bearing faces, said extensions being provided with transversely extending lugs at points spaced from the bearing surfaces, jaw members having bearing sockets engaging the curved bearing extensions of said ball member, said socket portions being slotted to straddle the projections, and means including the transversely extending lugs for retaining the curved socket portions of said jaws in engagement with the curved bearing faces of said extensions.

8. In a tow coupling, a central body member including a substantially spherical intermediate portion, spaced bearings fixed to the intermediate portion, a connecting element swiveled to said intermediate spherical portion, a pair of jaw members having coacting gripping faces formed at their outer extremity and bearing portions formed at their inner extremity, the bearing portions of said jaw members being in engagement with the spaced bearing portion of the central body member, and means for adjusting said jaws.

9. In a tow coupling, a central body member including a substantially spherical intermediate portion, spaced bearings fixed to the intermediate portion, guide pins carried by said curved bearings, a connecting element swiveled to said intermediate spherical portion, a pair of jaw members having coacting gripping faces formed at their outer extremity, and bearing portions formed at their inner extremity, the bearing portions of said jaw members being in engagement with the spaced bearing portion of the central body member, means for adjusting said jaws, and means carried by said pins for retaining the bearings in cooperative relation.

10. The substance of claim 8 characterized in that a spring is positioned between the jaw members for normally retaining the latter in expanded position.

11. The substance of claim 8 characterized in that the means for adjusting said jaws includes a bolt, a nut, and means for locking the nut against rotation carried by one of the jaw members.

12. The substance of claim 8 characterized in that the connecting element swiveled to the intermediate swiveled portion is formed of two sections, and these sections held together under spring tension.

13. In a tow coupling, a central body member including a substantially spherical intermediate portion and spaced arcuate bearing portions, a connecting element swivelled to the intermediate portion, a pair of jaw members having coacting gripping faces formed adjacent their outer extremity and bearing portions formed at their inner extremity, the bearing portions of said jaw members being shaped to engage said arcuate bearing portions of the central body member, means for adjusting said jaws, and means for locking said jaws in adjusted position.

14. In a tow coupling, a central body member including an intermediate bearing portion and spaced bearing portions, a connecting element adjustably engaging the intermediate bearing portion, a pair of jaw members having gripping faces formed adjacent their outer extremity and bearing portions formed at their inner extremity, the bearing portions of said jaw members engaging the spaced bearing portions of the central body member, means carried by the central body member for retaining the jaw members in engagement with the bearing extensions, and means for adjusting said jaws.

15. In a tow coupling, a central body member including a substantially spherical intermediate portion and spaced arcuate bearing portions, headed projections extending from the bearing portions, a connecting element swivelled to the intermediate portion, a pair of jaw members having coacting gripping faces formed adjacent their outer extremities and slotted bearing portions formed at their inner extremities, the bearing portions of said jaw members being shaped to engage said arcuate bearing portions of the central body member, said projections extending through said slots formed in said bearing portions and means for adjusting said jaws.

16. In a tow coupling, a central body member including a substantially spherical intermediate portion and spaced arcuate bearing portions, a connecting element swivelled to the intermediate portion, a pair of jaw members having coacting gripping faces formed adjacent their outer extremities and slotted bearing portions formed at their inner extremities, the bearing portions of said jaw members being shaped to engage the arcuate bearing portions of the central body member, means carried by said central body member and extending through the slots formed in said jaw members for retaining these parts in relative position, and means for locking said jaws in adjusted position.

17. A jaw member for use in a clamping device on a tow bar including spaced irregular gripping means at one end thereof, a substantially semi-spherical socket provided with a slot formed in the opposite end, means for the reception of a pivot means cooperating with said slot and means formed intermediate said ends for the reception of a securing mechanism.

LLOYD H. DRAEGER.